UNITED STATES PATENT OFFICE.

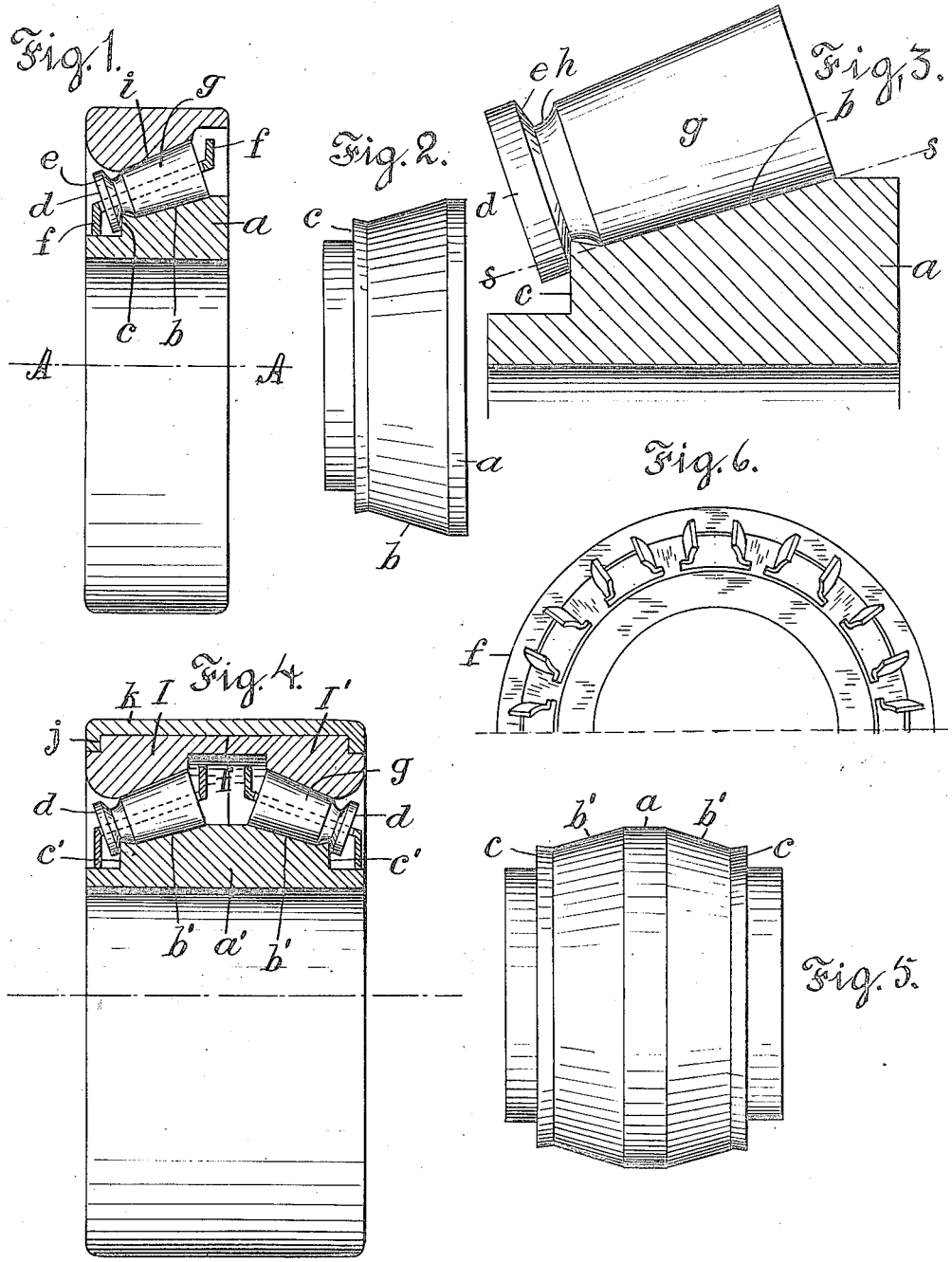

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING WITH THRUST-COLLAR.

1,144,484.

Specification of Letters Patent. Patented June 29, 1915.

Application filed February 19, 1915. Serial No. 9,255.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Roller-Bearings with Thrust-Collars, fully described and represented in the following specification and the accompanying drawings, forming a part of the same.

This invention relates to a roller bearing having a conical hub with a set of conical rollers fitted thereto and a casing having a tapering seat adapted to bear upon the outer sides of the rollers. In such bearings the rolls readily sustain the lateral thrust, but such thrust produces a tendency of the rollers, to move toward the larger ends of the roll-seats, which tendency must be resisted in some manner to keep the rollers in their proper working positions.

The present invention provides a particular means for resisting such tendency with the slightest amount of friction, the end-thrust being supported by a collar upon the smaller end of the roller bearing upon a shoulder on the smaller end of the hub. If the contact surface of such collar were wholly outside the line of the roll-seat it would revolve at a greater speed than the surface of the roll upon its seat and would produce an advancing tendency at such end of the roller. To avoid the friction caused by such tendency, which tends to twist the rollers out of their proper alinement in the bearing, the shoulder upon the hub is made to project a little above the roll-seat; and where the roller extends over such shoulder it is necessarily necked out or grooved to clear such projecting portion of the shoulder. The collar may be enabled to form a line contact with the shoulder, and thus greatly reduce the wear of the parts, by flaring or beveling it to contact evenly with the surface of the shoulder, and the parts are so proportioned that they bear equally upon one another outside and inside the line of the roll-seat. The portion inside the line of the roll-seat produces a slight drag upon the roller, while the portion outside the line of the roll-seat produces an acceleration of the movement, which tendencies may be substantially balanced by properly proportioning the bearing surfaces. A cage is commonly employed to guide the rolls in their movement about the hub, and the present construction avoids any tendency of the rollers to tip out of their proper positions in the cage, and thus avoids unnecessary friction between the rollers and cage.

The invention will be understood by reference to the annexed drawing, in which—

Figure 1 is an edge view, partly in section, of a bearing containing one set of rollers; Fig. 2 is an edge view of the hub for such bearing; Fig. 3 is a section of the hub and the roller greatly enlarged; Fig. 4 is an edge view, partly in section where hatched, of a bearing having double conical hub and two sets of rollers; and Fig. 5 is an elevation of the hub for such bearing. Fig. 6 shows a part of the cage, in end view.

In Figs. 1 to 3, $a$ designates the larger end of the hub, $b$ the tapering roll-seat, $c$ the shoulder a short distance from the end of such seat and projected above the line of the seat, as shown in Fig. 3, where $s-s$ designates the line of the seat.

The smaller end of the roll $g$ projects over and beyond the shoulder and is formed with a collar $d$ having a beveled face $e$ which contacts with the shoulder $c$.

The shoulder is preferably made flat so as to form a plane surface at right angles to the axis A, A, of the bearing, as the flat surface is easily produced; and the bevel is formed to make a line contact with the shoulder, which greatly promotes its durability.

The roller is necessarily necked or grooved at $h$ adjacent to the collar, to clear the outwardly projecting portion of the roll-seat which forms a shoulder, and such projection and the diameter of the collar $d$ are proportioned, as shown in Fig. 3, to produce a contact of the roller and shoulder equally inside and outside of the line $s, s$.

The portion within the line of contact necessarily revolves more slowly than the body of the roll, while the portion outside of the contact revolves more rapidly, and the tendency of either of these portions of the contacting surface to retard or advance the roll, or tip it in its cage, may thus be completely balanced.

A cage $f$ is shown in the drawing, as the cage is preferable to guide the rollers in the bearing, but the form of cage is immaterial.

In Fig. 4, the invention is shown applied to a bearing containing two sets of rollers revolving upon a double conical hub with outwardly facing shoulders at the smaller ends of the roll-seats, in which construction the parts can only be assembled by dividing the casing transversely and connecting the two halves when the parts are in their working position.

In Fig. 4, the hub is designated $a'$, the two roll-seats $b'$, the shoulders at the ends of the roll-seats $c'$, which shoulders project outward beyond the line of the roll-seats, as is clearly shown in Fig. 5.

Each set of rollers is shown provided with its own cage $f$, and the two parts of the casing are marked I and I', and shown each with a rabbet $j$ in its outer corner.

The shell to complete the casing is formed with a hook-flange at one end to fit one of the rabbets, and made of sufficient length at the opposite end to be spun or bent into the opposite rabbet, thus locking the whole structure together, as indicated in Fig. 4.

The construction for either the single or double bearing is very simple, as the rollers are not complicated by any attachments, but simply fitted within the cage $f$, their collars enabling them to resist end thrust with a minimum of friction.

Having thus set forth the nature of the invention what is claimed herein is:

1. A roller bearing having a conical hub with a shoulder at its smaller end said shoulder projecting radially beyond the line of the roll-seat, and a set of tapering rollers each extended over said shoulder and having a neck to clear the projecting portion of the shoulder, and having adjacent such neck a collar making a line contact with the said shoulder, and bearing equally upon the same outside and inside the line of the roll-seat.

2. A roller bearing having a conical hub with a substantially flat shoulder at its smaller end, said shoulder projected radially beyond the line of the roll-seat, a set of rollers each extended over the said shoulder and having a neck to clear such projecting portion of the shoulder, and having adjacent such neck a collar flared to make a line contact with said shoulder, and a cage to guide the rollers in the bearing.

3. In a roller bearing for sustaining lateral and end thrusts, the combination, with a double conical hub with outwardly facing shoulders near the smaller ends of the roll-seats and the shoulders projected beyond the line of the roll-seats, of two sets of taper rollers fitted respectively to the seats and extended over the said shoulder and having each a neck to clear the projecting portion of the shoulder and having adjacent such neck a collar making a contact with the said shoulder, and a casing having roll-seats fitted to the outer sides of such rollers and formed with clearance for the outer sides of the said collars.

In testimony whereof I have hereunto set my hand in the presence of two subscribing witnesses.

CHARLES S. LOCKWOOD.

Witnesses:
Thomas S. Crane,
H. W. Angevine.